(12) United States Patent
Gondo

(10) Patent No.: US 9,483,133 B2
(45) Date of Patent: Nov. 1, 2016

(54) HANDLE SWITCH DEVICE

(71) Applicant: SUZUKI MOTOR CORPORATION, Hamamatsu-shi, Shizuoka (JP)

(72) Inventor: Yuki Gondo, Hamamatsu (JP)

(73) Assignee: SUZUKI MOTOR CORPORATION, Shizuoka (JP)

(*) Notice: Subject to any disclaimer, the term of this patent is extended or adjusted under 35 U.S.C. 154(b) by 60 days.

(21) Appl. No.: 14/502,615

(22) Filed: Sep. 30, 2014

(65) Prior Publication Data

US 2015/0100204 A1    Apr. 9, 2015

(30) Foreign Application Priority Data

Oct. 3, 2013    (JP) ................. 2013-208164

(51) Int. Cl.

| | | |
|---|---|---|
| G06F 3/041 | (2006.01) | |
| G06F 7/00 | (2006.01) | |
| B60R 16/02 | (2006.01) | |
| G06F 3/01 | (2006.01) | |
| G06F 3/0488 | (2013.01) | |
| B62J 6/16 | (2006.01) | |
| B62K 11/14 | (2006.01) | |
| G06F 3/038 | (2013.01) | |
| G06F 3/0484 | (2013.01) | |
| G06F 3/0354 | (2013.01) | |
| B62J 99/00 | (2009.01) | |

(52) U.S. Cl.
CPC .............. *G06F 3/041* (2013.01); *B60R 16/02* (2013.01); *B62J 6/16* (2013.01); *B62J 99/00* (2013.01); *B62K 11/14* (2013.01); *G06F 3/016* (2013.01); *G06F 3/038* (2013.01); *G06F 3/03547* (2013.01); *G06F 3/0484* (2013.01); *G06F 3/0488* (2013.01); *B62J 2099/002* (2013.01); *G06F 2203/04806* (2013.01)

(58) Field of Classification Search
None
See application file for complete search history.

(56) References Cited

U.S. PATENT DOCUMENTS

| | | | | |
|---|---|---|---|---|
| 2005/0012723 A1* | 1/2005 | Pallakoff | ............... | G06F 1/1616 345/173 |
| 2012/0029731 A1* | 2/2012 | Waldock | ............... | G05D 1/0044 701/2 |

FOREIGN PATENT DOCUMENTS

| | | | |
|---|---|---|---|
| JP | 2013-112018 | * | 11/2011 |
| JP | 2013-112018 A | | 6/2013 |
| JP | 2013-112018 A | * | 10/2013 |

OTHER PUBLICATIONS

Machine Translated English Version of JP 2013-112018 via eSpaceNet (note that the original Japanese document JP 2013-112018 is already on record per IDS dated Sep. 30, 2014, but is also attached to this document as well as shown above).*

* cited by examiner

*Primary Examiner* — Adam Tissot
*Assistant Examiner* — Tommy Worden
(74) *Attorney, Agent, or Firm* — Stein IP, LLC (57) ABSTRACT

There is provided a handle switch device provided at a position adjacent to a grip part at an end portion of a handle and provided with a control device for controlling an operation of a predetermined vehicle-mounted device by an operation of a passenger. The control device includes a touch pad having an operation surface that the passenger touches upon the operation, a touch sensor for detecting a touch of the passenger to the operation surface and a computing device for performing an operation determination based on an output of the touch sensor. The operation surface is formed as a continuous surface that can be touched by the passenger through a drag operation. The touch sensor can detect the touch to the operation surface at least by the drag operation.

6 Claims, 6 Drawing Sheets

HANDLE SWITCH DEVICE

The disclosure of Japanese Patent Application No. 2013-208164 filed on Oct. 3, 2013, including specification, drawings and claims is incorporated herein by reference in its entirety.

TECHNICAL FIELD

The present invention relates to a handle switch device, and more particularly, to a handle switch device capable of controlling an operation of a vehicle-mounted device by an operation of a passenger.

BACKGROUND

For a two-wheeled vehicle and the like, a handle bar is provided with a switch device so as to operate a variety of vehicle-mounted devices (for example, a winker, a headlamp and the like) not only during stop but also during traveling. In recent years, an operation switch of the switch device is additionally provided with a variety of functions such as a switching of a traveling mode and the like, in addition to the control of the winker and headlamp. Accompanied with this, the number of mounted operation switches is also increased.

Patent Document 1 discloses an example of the above switch device. The switch device of Patent Document 1 has a plurality of operation switches. Each operation switch is provided with a part to be contacted formed at a switch case and a sensor formed in correspondence to a position of the part to be contacted. The operation switches are respectively provided in correspondence to the vehicle-mounted devices. When a finger of a passenger is touched to the part to be contacted, the sensor detects the touch and a predetermined electric signal is transmitted to the vehicle-mounted device.

In a configuration shown in FIG. 2 of Patent Document 1, a rib for partitioning the operation switches arranged in a vertical direction is formed on a front surface of the switch case. A finger tip operating any operation switch abuts on the rib, so that it is possible to prevent a next operation switch from being unintentionally operated. Also, in a configuration shown in FIG. 5 of Patent Document 1, the part to be contacted has a concave shape, and in a configuration shown in FIG. 6, the part to be contacted has a convex shape, so that the operation can be easily performed by the concave and convex shapes.

Patent Document 1: Japanese Patent Application Publication No. 2013-112018A

However, according to the switch device of Patent Document 1, when the number of the vehicle-mounted devices is increased, the number of the operation switches to be provided is correspondingly increased. For this reason, the number of components and the cost for molding are increased and the structure becomes complicated.

Also, when the rib is formed in an intermediate region of the front surface of the switch case in the vertical direction, as shown in FIG. 2 of Patent Document 1, the operation switch cannot be provided in the region where the rib is formed. For this reason, according to the shown configuration, a region where the operation switch can be provided is limited, and an operation range by the finger tip is also limited.

Further, when the part to be contacted has the concave or convex shape, as shown in FIGS. 5 and 6 of Patent Document 1, the shape becomes complicated, which increases the cost as regards the molding and the like. Also, since the operation of the finger tip is performed only at the concave and convex portions, a degree of operation freedom of the operation switch is decreased.

SUMMARY

It is therefore an object of the present invention to provide a handle switch device capable of simplifying a structure thereof and improving a degree of operation freedom of a passenger on an operation surface.

According to an aspect of the embodiments of the present invention, there is provided a handle switch device provided at a position adjacent to a grip part at an end portion of a handle and provided with a control device for controlling an operation of a predetermined vehicle-mounted device by an operation of a passenger. The control device includes a touch pad having an operation surface that is touched by the passenger upon the operation, a touch sensor configured to detect a touch of the passenger to the operation surface and a computing device configured to perform an operation determination on the basis of an output of the touch sensor. The operation surface is formed as a continuous surface that can be touched by the passenger through a drag operation. The touch sensor is configured to detect the touch to the operation surface at least by the drag operation.

According to the above configuration, since the operation surface is formed as a continuous surface on which a drag operation can be performed and the touch to the operation surface at least by the drag operation can be detected, it is possible to secure a wide area of the operation surface so that the drag operation can be performed. Thereby, it is possible to improve a degree of freedom of an input operation touching the operation surface and to provide a variety of variations as regards a touch position of a finger to the operation surface for control of the vehicle-mounted device, a drag operation direction, a trajectory and the like. As a result, it is possible to perform a plurality of input operations on the single touch pad and it is not necessary to provide a plurality of switches. Thereby, it is possible to reduce the number of components such as a wiring and the molding cost and to simplify a structure.

In the handle switch device, preferably, the control device is used to control a plurality of vehicle-mounted devices and is configured to change a vehicle-mounted device to be a control target, in accordance with a vehicle state or an arbitrary operation of the passenger. According to this configuration, it is possible to unify an input operation target of the passenger as regards a plurality of vehicle-mounted devices and to control the plurality of vehicle-mounted devices by using the single operation surface as a common interface, which improves the convenience. Further, as compared to a structure of the related art where operation switches are respectively provided for each vehicle-mounted device, it is possible to omit a complicated layout and a wiring structure of the switches and to reduce the molding cost and the number of components. Therefore, it is possible to reduce burdens of the manufacturing and maintenance.

Also, in the handle switch device, preferably, the control device includes a rib formed outside of an outer rim of the operation surface and extending in a direction along the outer rim. In this case, even when the passenger is driving, a finger tip is touched to the rib, so that the passenger can perceive a position of the operation surface through a sense of the finger tip. Further, since it is possible to easily move the finger in the extending direction of the rib with pressing the finger tip to the rib, it is possible to increase the reliability of the input on the operation surface, which improves the operability.

Further, in the handle switch device, preferably, the rib is provided in the vicinity of the outer rim of the operation surface, at a position most distant from a hand of the passenger gripping the grip part. In this case, the finger tip is touched to the rib, so that the passenger can easily perceive an operation limit on the operation surface in a direction distant from a hand of the passenger gripping the grip part. Thereby, it is possible to prevent an erroneous operation, which is caused when the finger tip is out of from the operation surface, and to easily operate the operation surface in the vicinity of the outer rim by the finger tip.

Also, in the handle switch device, preferably, the rib includes a plurality of the ribs, at least one of the ribs is oriented parallel with an axis direction of the handle and at least another of the ribs is oriented towards a direction orthogonal to the axis direction of the handle. In this case, since the ribs are provided in the two directions orthogonal to each other, it is possible to easily perceive an operating direction and position of the finger tip not only in the extending directions of the ribs but also in all direction along a plane direction of the operation surface, which further improves the reliability of the input on the operation surface.

Also, in the handle switch device, preferably, the control device includes a vibration generation device configured to vibrate at least one of the rib and the touch pad upon the operation of the passenger. In this case, it is possible to propagate the vibration to the finger tip touching the rib or touch pad. Also, it is possible to change a type of the vibration, i.e., a frequency and a level of the vibration and an on and off repeating pattern of the vibration, in response to a variety of operations of the passenger. Thereby, it is possible to feed back the input operation to the finger of the passenger by changing the type of the vibration, in correspondence to the detected input operation of the touch pad. As a result, while the passenger concentrates on the driving, the passenger can check the operation performed on the touch pad through the sense of touch of the finger tip, which improves the convenience.

Also, in the handle switch device, preferably, the control device limits an operation-possible area of the operation surface to a periphery of the rib when the vehicle is traveling. In this case, when operating the operation surface during the traveling, the finger tip is touched to the rib. Thus, while the passenger concentrates on the driving, the passenger can easily perceive the operation position on the operation surface through the sense of the finger tip touching the rib, which improves the convenience.

Also, in the handle switch device, the control device is configured to enlarge or reduce an operation-possible area of the operation surface, in correspondence to a vehicle state or a vehicle-mounted device to be a control target. In this configuration, it is possible to respectively control the different vehicle-mounted devices with an optimal operation method in accordance with the vehicle state and the like by using the single operation surface as a common interface, which improves the convenience.

Also, in the handle switch device, the handle switch device is preferably applied to a saddle-ridden type vehicle. As the saddle-ridden type vehicle, a two-wheeled vehicle and a snowmobile can be exemplified. In this vehicle, the passenger grips the grip part of the hand for a long time when riding the vehicle. Therefore, a time period for which an input operation can be performed on the touch pad is also prolonged, when riding the vehicle. Thus, it is possible to improve the convenience of the touch pad.

According to the present invention, it is possible to simplify the structure and to improve the degree of operation freedom of the passenger on the operation surface.

DETAILED DESCRIPTION OF THE EMBODIMENTS

Hereinafter, an illustrative embodiment of the present invention will be described in detail with reference to the accompanying drawings. In the below, an example where a handle switch device of the present invention is applied to a two-wheeled vehicle is described. However, the present invention is not limited thereto and can be changed. For example, the handle switch device of the present invention can be also applied to a vehicle of another type having a grip part provided at an end portion of a handle.

Figure 1:
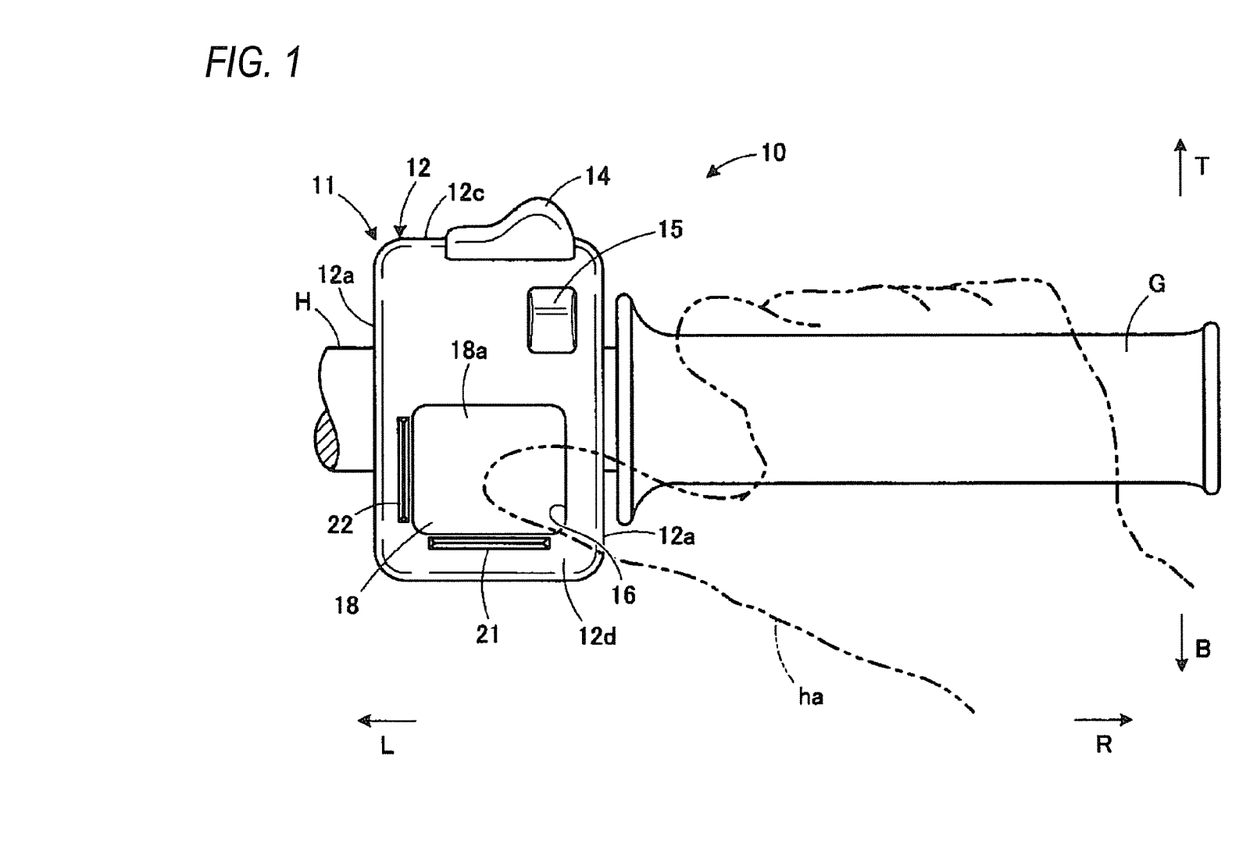
FIG. 1 is a front view illustrating an attached state of a handle switch device according to an illustrative embodiment.
Figure 2:
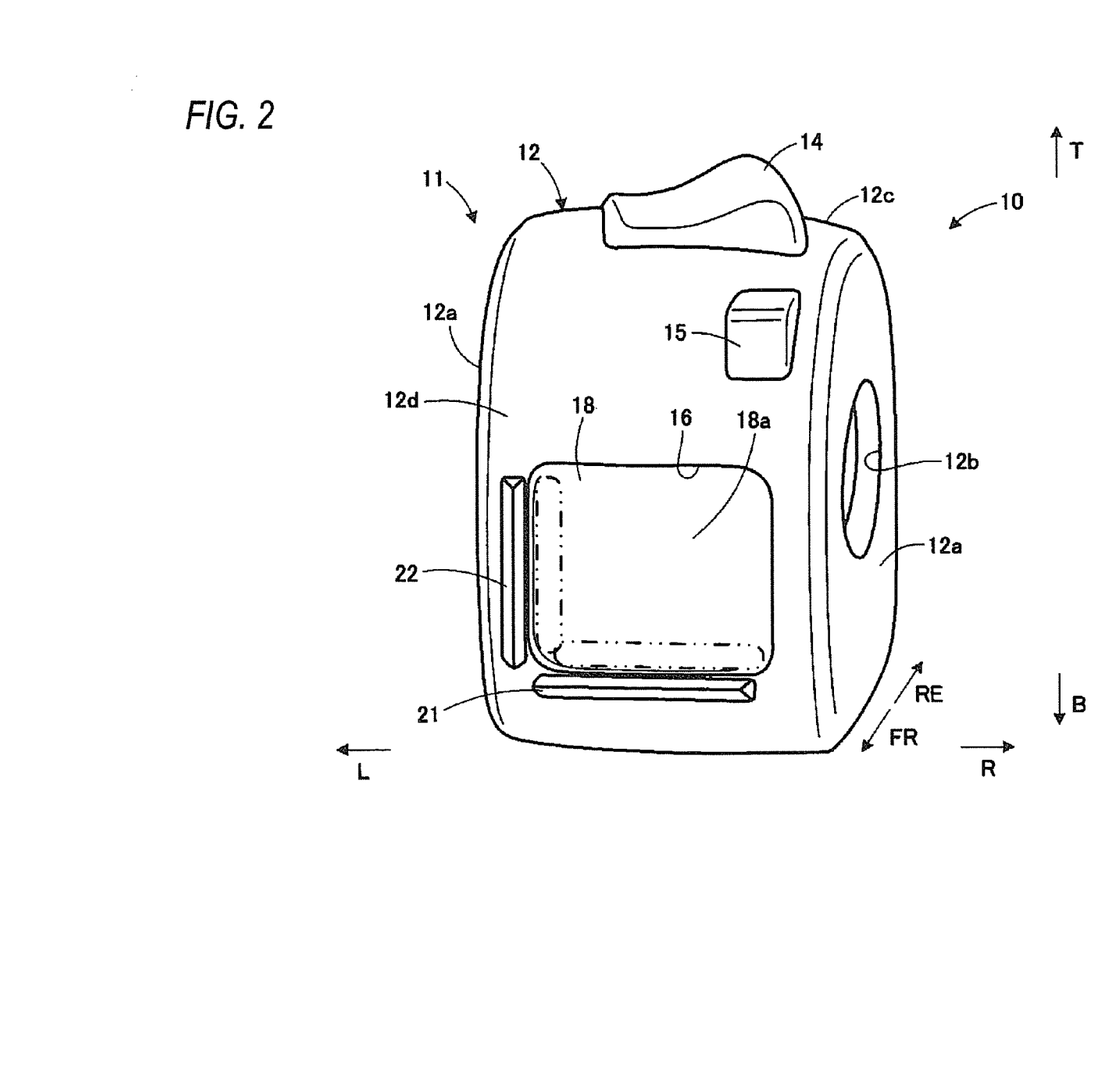
FIG. 2 is a schematic perspective view of the handle switch device.
Figure 3:
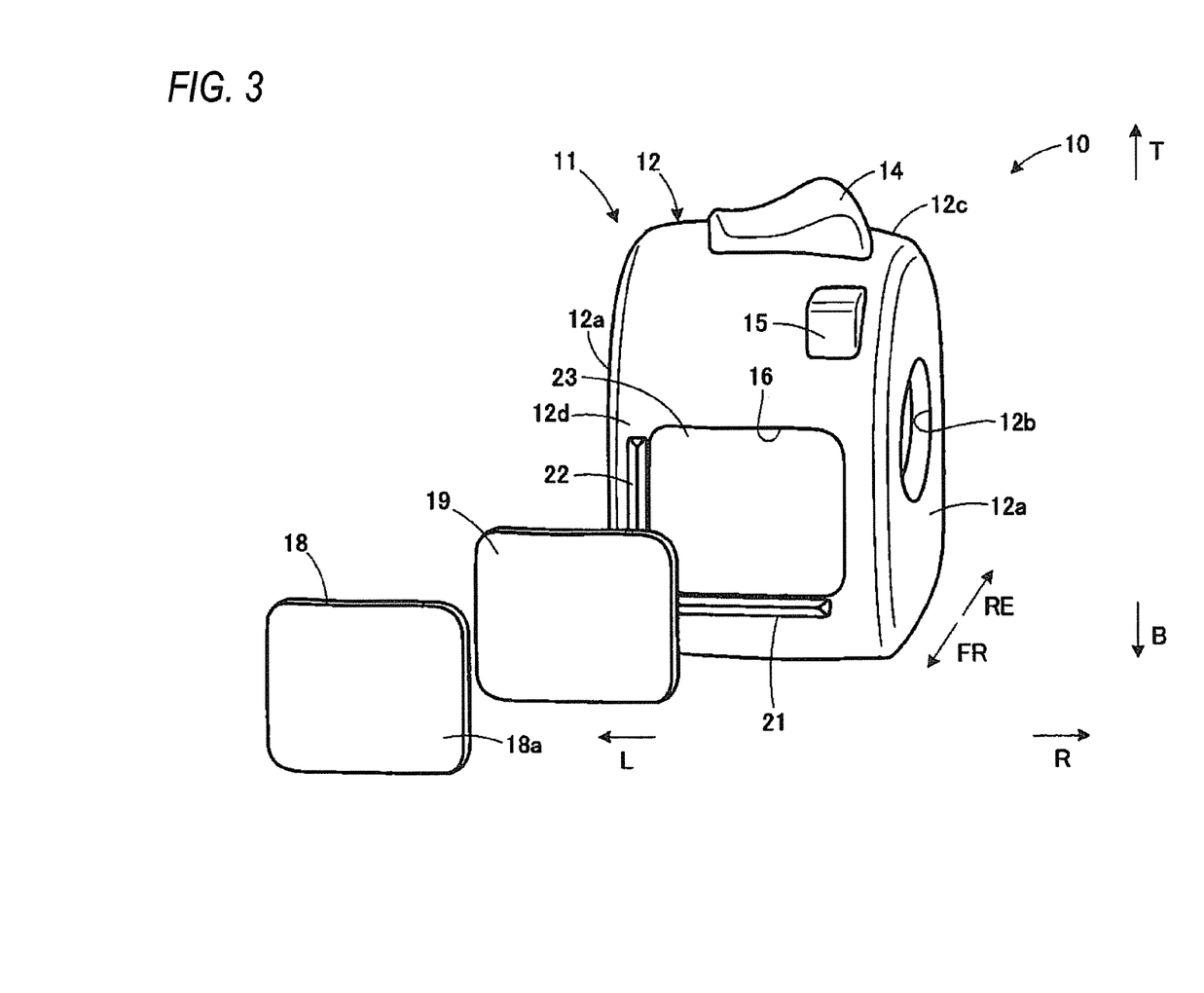
FIG. 3 is an exploded view of FIG. 2.

A handle switch device of the illustrative embodiment is described with reference to FIGS. 1 to 3. FIG. 1 is a front view illustrating an attached state of the handle switch device. FIG. 2 is a schematic perspective view of the handle switch device, and FIG. 3 is an exploded view of FIG. 2. Meanwhile, in below descriptions, the front is denoted with an arrow FR, the rear is denoted with an arrow RE, the left is denoted with an arrow L, the right is denoted with an arrow R, the upper is denoted with an arrow T and the lower is denoted with an arrow B. Also, a part of the configuration may be omitted for convenience of explanations in the respective drawings.

As shown in FIG. 1, a handle switch device 10 is attached to a handle H having a bar shape for steering a two-wheeled vehicle. Both end portions of the handle H are provided with grip parts G (a grip part of the left end portion is not shown) that are gripped by a passenger upon operation of the vehicle, respectively. In FIG. 1, the handle switch device 10 is arranged at a position adjacent to the left side of the grip part G. The handle switch device 10 is provided with a control device 11 for controlling operations of a plurality of vehicle-mounted devices (not shown) mounted to the two-wheeled vehicle through an operation of the passenger.

As shown in FIG. 2, the control device 11 has a box-shaped case 12 of which an upper surface forms a substantially semi-cylindrical shape. The case 12 has an internal space in which a microcontroller (a computing unit) 13 (not shown in FIG. 2, refer to FIG. 4) is embedded. Both left and right sidewalls 12*a* of the case 12 are respectively formed with holes 12*b* (a left hole is not shown) through which the handle H is inserted. When the handle H is inserted into the holes 12*b* and a position of the case 12 is restrained by a fixture (not shown), the control device 11 is mounted to the handle H. A top wall 12c of the case 12 is provided with a switch 14 of which left and right ends are pushed to operate, and a front wall 12d of the case 12 is provided with a switch 15 configured to slide in a vertical direction. Also, the front wall 12d of the case 12 is formed with a substantially rectangular opening 16.

As shown in FIGS. 2 and 3, the control device 11 is provided with a touch pad 18 exposed in the opening 16 and a touch sensor 19 provided to overlap a rear surface of the touch pad 18, in the case 12. A front surface of the touch pad 18, which is an area exposed in the opening 16, is an operation surface 18a, and an outer rim of the operation surface 18a is formed by an edge of the opening 16. The operation surface 18a is an area that is touched by a finger of a passenger when the passenger performs an input operation. The operation surface 18a is formed as a continuous surface by a flat surface or smoothly convex or concave curved surface. Therefore, the passenger can perform on the operation surface 18a not only a tap operation of tapping a finger thereon but also a drag operation of sliding a finger with the finger tip being touched thereon.

When the finger of the passenger is touched to the operation surface 18a, the touch sensor 19 detects coordinates of a touched position and outputs the same to an operation determination unit 31, which will be described later. As the touch sensor 19, a resistive type touch sensor, a surface acoustic wave type touch sensor, an infrared type touch sensor, a touch sensor consisting of matrix switches and the like may be adopted, in addition to a capacitive type touch sensor.

The front wall 12d of the case 12 is formed at a periphery of the opening 16 with a first rib 21 and a second rib 22. The first rib 21 is formed outside of a lower outer rim (an edge of the opening 16) of the operation surface 18a and extends in a horizontal direction along the outer rim. The second rib 22 is formed at outside of a left outer rim of the operation surface 18a and extends in a vertical direction along the outer rim. Therefore, the first rib 21 is oriented parallel with an axis direction (the horizontal direction) of the handle H, and the second rib 22 is oriented towards the direction (the vertical direction) orthogonal to the axis direction of the handle H. Here, as shown in FIG. 1, among outer rims of four sides of the rectangular operation surface 18a, a left outer rim is most distant from a right hand ha of the passenger gripping the grip part G and the second rib 22 is provided in the vicinity of the left outer rim.

As shown in FIG. 3, a vibration generation device 23 is incorporated at the rear of the touch sensor 19 in the case 12. The vibration generation device 23 is not particularly limited. For example, a configuration where a weight (not shown) is mounted to a rotational shaft of a motor (not shown) at an eccentric state from a center of rotation may be exemplified. Therefore, the vibration generation device 23 is configured to vibrate and to propagate the vibration through touch sensor 19 and the like, thereby vibrating the first rib 21, the second rib 22 and the touch pad 18, respectively. Also, the vibration generation device 23 is configured to adjust a frequency and a level of the vibration and an on and off repeating pattern of the vibration, in response to an electric signal output from the microcontroller 13.

When operating the handle switch device 10, the passenger touches the thumb of the right hand ha to the operation surface 18a with gripping the grip part G with the right hand, during the traveling of the vehicle. Since the touch pad 18 can detect the touch of the finger tip on all areas of the operation surface 18a, it is possible to provide an input operation pattern with various variations by changing a position of the tap operation and a position and a direction of the drag operation. Thereby, it is possible to use the control device 11 having the single operation surface 18a for control of a plurality of vehicle-mounted devices, and to simplify a wiring and a structure of a sensor and to reduce the molding cost, as compared to a configuration where a plurality of operation switches is provided like the related art.

At the state where the thumb of the right hand ha is touched to the operation surface 18a, when the thumb is touched to an upper side of the first rib 21 or a right side of the second rib 22, the passenger can determine the position of the operation surface 18a through a sense of touch of the finger tip, even though the periphery of the operation surface 18a does not come into sight of the passenger during the driving.

Also, since the first rib 21 extends in the horizontal direction, when the upper side of the first rib 21 is pressed by the thumb, the first rib 21 is enabled to serve as a guide, so that the passenger can easily slide the thumb in the horizontal direction. In the meantime, the second rib 22 is also the same, so that the passenger can easily slide the thumb in the vertical direction. Further, since the first rib 21 and the second rib 22 are provided along the two sides of the rectangular operation surface 18a, the passenger can easily perceive the operating direction and position in all directions of the operation surface 18a by the sense of touch of the finger tip. In addition, when the second rib 22 is pressed by the finger tip of the thumb, the passenger can easily perceive the operation limit of the thumb in a direction distant from the right hand ha, i.e., in a left direction. Thereby, it is possible to improve the reliability of the input operation using the respective ribs 21, 22.

Also, it is possible to propagate the vibration to the finger tip through the respective ribs 21, 22 by the vibration generation device 23. Therefore, even when the passenger puts on a glove, it is possible to effectively propagate the vibration to the finger tip, thereby accomplishing a favorable operational feeling.

Figure 4:
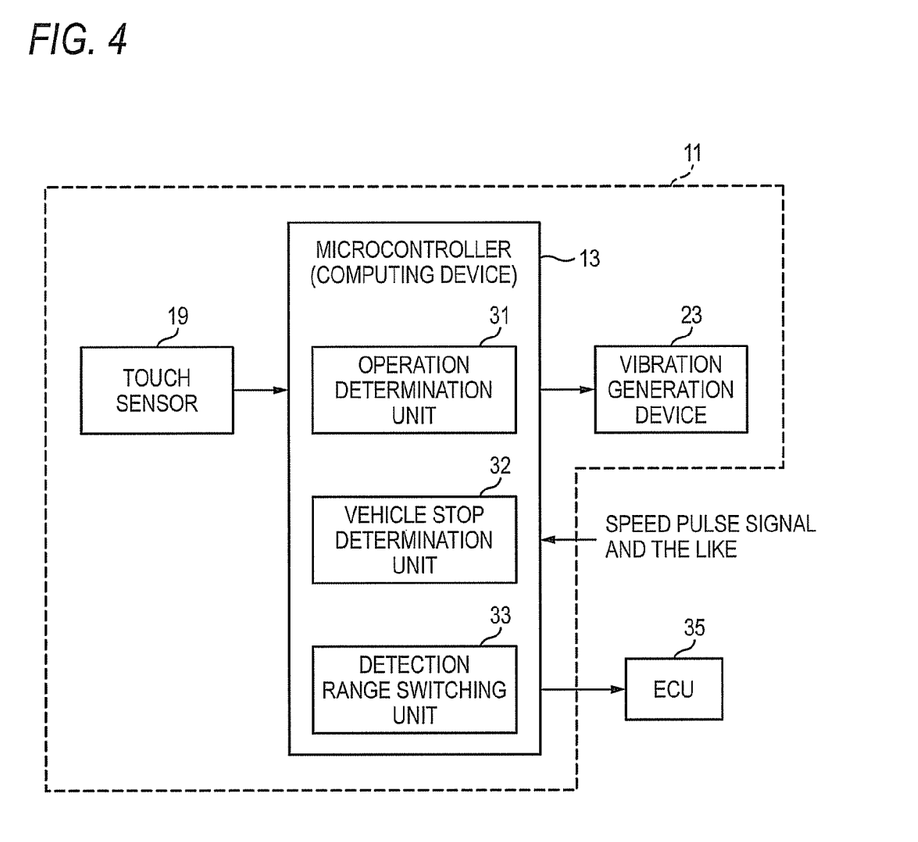
FIG. 4 is a block diagram showing a configuration example of a microcontroller.

Subsequently, a configuration of the microcontroller (the computing device) 13 is described with reference to FIG. 4. FIG. 4 is a block diagram showing a configuration example of the microcontroller 13. As shown in FIG. 4, the microcontroller 13 has an operation determination unit 31, a vehicle stop determination unit 32 and a detection range switching unit 33. The microcontroller 13 is connected to the touch sensor 19 and the vibration generation device 23 through a wiring and the like in the case 12. Also, the microcontroller 13 is connected to an ECU (Electronic Control Unit) 35, which is a separate device from the control device 11, and is configured to input and output a control signal and the like.

A signal output from the touch sensor 19 is input to the operation determination unit 31. The signal is information about position coordinates at which a finger is touched to the operation surface 18a. The operation determination unit 31 is configured to determine a type of an input operation performed on the operation surface 18a, based on the signal output from the touch sensor 19. The operation determination unit can determine the drag operation by detecting at least the position coordinates at which the finger is touched to the operation surface 18a and whether the position coordinates are moved or not. For example, the operation determination unit determines the drag operation from a left-lower area to a right-lower area of the operation surface 18a as a lighting operation of a right winker and determines the drag operation from a right-lower area to a left-lower area of the operation surface 18a as a lighting operation of a left winker. A determination result of the operation determination unit 31 is output to the ECU 35 through a serial communication interface and the like, as a signal.

Regarding the signal of the determination result, which is output as a result of the determination of the operation determination unit 31 based on the signal of the position coordinate information from the touch sensor 19, the position coordinates on the operation surface 18a becomes an output signal when the tap operation of touching the finger to the operation surface 18a is performed, in the above example. Also, when the drag operation is performed on the operation surface 18a, the movement of the position coordinates becomes an output signal, in addition to the position coordinates on the operation surface 18a. For example, in the above drag operation, a moving trajectory on the coordinate system of the operation surface 18a may be included in an output signal. Also, when a pinch operation of touching two fingers to the operation surface 18a and sliding the respective fingers with the forgers being touched to the operation surface 18a is performed, a change amount between the respective fingers becomes an output signal. Further, when a flick operation of quickly sliding a finger on the operation surface 18a is performed, a moving speed may be included in an output signal, in addition to the moving trajectory on the operation surface 18a. Also, when the tap operation is performed, a period for which the finger is touched to the operation surface 18a may be included in an output signal, in addition to the position coordinates on the operation surface 18a, and when a plurality of tap operations is continuously performed, the number of operation times may be included in an output signal.

Also, the operation determination unit 31 is configured to detect the position coordinate information input from the touch sensor 19 as regards the touch of the passenger on all areas of the operation surface 18a or the touch of the passenger only on a partial area of the operation surface 18a, under control of the detection range switching unit 33 that will be described later.

The vehicle stop determination unit 32 is configured to input a speed pulse signal from a speed sensor (not shown) and the like of the two-wheeled vehicle and to determine whether the two-wheeled vehicle stops or is traveling, based on the input signal. A determination result of the vehicle stop determination unit 32 is output to the detection range switching unit 33, as a signal.

The detection range switching unit 33 is configured to change a detection range of the operation determination unit 31 as regards the position coordinate information from the touch sensor 19 by software processing in the microcontroller 13 in accordance with the output result of the vehicle stop determination unit 32, thereby enlarging and reducing an operation-possible area on the operation surface 18a or changing the position or range on the operation surface 18a (the touch sensor 19 continues to output the position coordinate information in all areas). For example, when the vehicle is traveling, the detection range switching unit reduces the operation-possible area of the operation surface 18a to the peripheries of the respective ribs 21, 22, i.e., a lower end-side and a left end-side of the operation surface 18a shown with dashed-two dotted lines in FIG. 2. Therefore, the touch of the finger tip on the operation surface 18a in an area except for the lower end-side and the left end-side of the operation surface 18a is not detected. On the other hand, when the vehicle stops, the detection range switching unit enlarges the operation-possible area to all areas of the operation surface 18a.

In the meantime, the detection range switching unit 33 may change the operation-possible area of the operation surface 18a, in correspondence to the vehicle-mounted device that is a control target of the control device 11. For example, when the control target is a winker, the detection range switching unit reduces the operation-possible area to the lower end-side of the operation surface 18a, and when the control target is a navigation system, the detection range switching unit sets the operation-possible area to all areas of the operation surface 18a.

The ECU 35 consists of an electronic control device configured to perform a variety of electric controls for the various vehicle-mounted devices such as the winker, the navigation system and the like, and is connected to the respective vehicle-mounted devices through wirings and the like. The ECU 35 can select a vehicle-mounted device, which is a control target, from the plurality of vehicle-mounted devices to be control targets, based on the determination result of the operation determination unit 31. Also, the ECU 35 is configured to output a signal including an operation command to the vehicle-mounted device selected as a control target, thereby performing the controls such as an on and off switching and the like.

Figure 5:
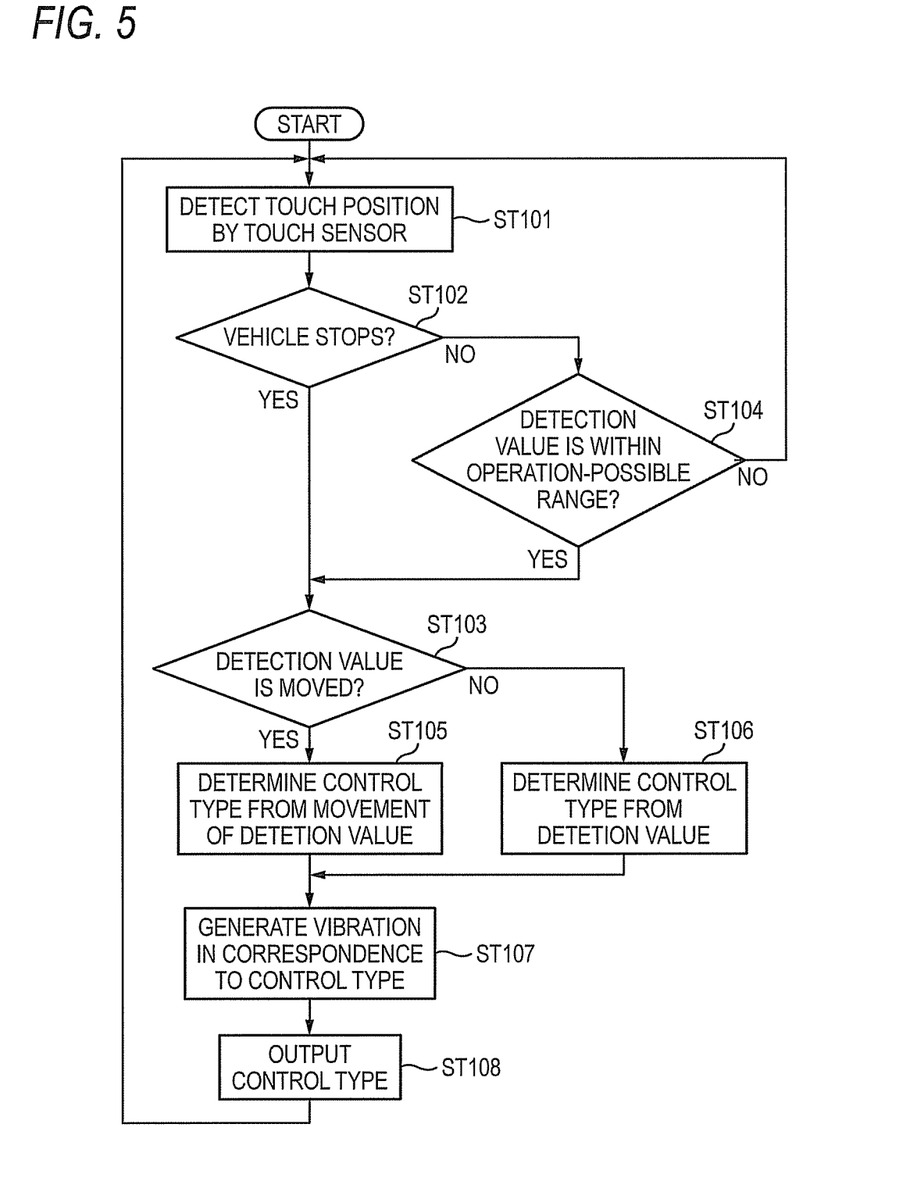
FIG. 5 is a flowchart showing processing in the microcontroller.

Subsequently, a control flow of the microcontroller 13 is described with reference to FIG. 5. FIG. 5 is a flowchart showing an example of processing that is executed in the microcontroller 13.

When the finger tip of the passenger is touched to the operation surface 18a of the touch pad 18, the touch position is detected by the touch sensor 19 (step ST101) and a detection value is output to the operation determination unit 31. Then, it is determined in the vehicle stop determination unit 32 whether the two-wheeled vehicle stops or not, based on the speed pulse signal (step ST102). When the vehicle stop determination unit 32 determines that the two-wheeled vehicle stops (step ST102: Yes), it is determined in the operation determination unit 31 whether the detection value of the operation determination unit 31 includes the movement of the position coordinates, i.e., whether the operation of sliding the finger tip on the operation surface 18a is performed (step ST103). Also, when the vehicle stop determination unit 32 determines that the two-wheeled vehicle stops, the operation-possible area is all areas of the operation surface 18a because the operation-possible area of the operation surface 18a is not adjusted.

When it is determined in the vehicle stop determination unit 32 that the two-wheeled vehicle is not at the stop state, i.e., the two-wheeled vehicle is traveling (step ST102: No), the operation-possible area of the operation surface 18a is reduced by the detection range switching unit 33. Then, it is determined in the operation determination unit 31 whether the position coordinates becoming the detection value of the touch sensor 19 are within the operation-possible area becoming a part of the operation surface 18a (step ST104). When it is determined in the operation determination unit 31 that the detection value is within the operation-possible area of the operation surface 18a (step ST104: Yes), the microcontroller proceeds to step ST103. When it is determined that the detection value is not within the operation-possible area of the operation surface 18a (step ST104: No), the touch detection of the touch sensor 19 is again performed (step ST101).

In step ST103, when it is determined that the detection value includes the movement (step ST103: Yes), the operation determination unit 31 selects a vehicle-mounted device and determines a control type of the vehicle-mounted device, based on the detection value including the movement (step ST105). In step ST103, when it is determined that the detection value does not include the movement (step ST103: No), the operation determination unit 31 selects a vehicle-mounted device and determines a control type of the vehicle-mounted device, based on the detection value (step ST106).

When any of steps ST105 and ST106 is completed, the microcontroller sets conditions of the vibration frequency and the like from the vibration generation device 23 and controls the vibration generation device 23 to operate at the set conditions, based on the determined control type (step ST107). Thereby, the respective ribs 21, 22 and the touch pad 18 are vibrated. The vibrations are transmitted to the finger tip, so that the input operation is fed back to the passenger. Thereafter, the determined control type is output from the operation determination unit 31 to the ECU 35, as a signal (step ST108). Then, the ECU 35 controls the selected vehicle-mounted device to operate in conformity to the determined control type, based on the signal of the control type. After outputting the determined control type, the touch detection of the touch sensor 19 is again performed (step ST101).

In this way, according to the control device 11 of this illustrative embodiment, it is possible to change the vehicle-mounted device, which is a control target, and to determine the control type of the vehicle-mounted device, based on the detection value of the touch sensor 19 resulting from the input operation of the passenger on the operation surface 18*a*. Thereby, it is possible to control the plurality of vehicle-mounted devices by using the single operation surface 18*a* as a common interface, which improves the convenience.

On the other hand, the vehicle-mounted device may be selected and the control type thereof may be determined, depending on the determination result of the vehicle state in step ST102. For example, when the vehicle is traveling, the controllable vehicle-mounted device is limited so that only the minimum necessary vehicle-mounted device such as the winker can be controlled. Then, the unintentional operations in the other vehicle-mounted devices such as the navigation system are restrained. On the other hand, when the vehicle stops, the operation target is changed automatically or by the intention of the passenger so as to operate the vehicle-mounted device such as a map screen of the navigation system, for example.

Also, when the vehicle is traveling, the control device 11 limits the operation-possible area of the operation surface 18*a* to the peripheries of the respective ribs 21, 22 by the detection range switching unit 33. Therefore, it is possible to reduce a burden on the passenger not to perform an unintentional operation, and to secure the safety. Further, it is possible to securely pick up the minimum necessary operation corresponding to the vehicle-mounted device by limiting the input operation. On the other hand, when the vehicle stops, the operation-possible area of the operation surface 18*a* becomes all the areas. Therefore, it is possible to increase the degree of operation freedom by enabling the passenger to perform the pinch operation of enlarging and reducing a map displayed on a monitor, the drag operation and the like at a mode in which the map can be operated, for example. In the meantime, the enlarged/reduced operation-possible area on the operation surface 18*a* is just exemplary. That is, the range and position of the area are appropriately changed, depending on the vehicle-mounted device to be a control target.

In the meantime, the present invention is not limited to the above illustrative embodiment and can be variously changed and implemented. In the above illustrative embodiment, the sizes, the shapes and the like shown in the accompanying drawings are not limited thereto and can be appropriately changed inasmuch as the effects of the present invention are accomplished. In addition, the above illustrative embodiment can be appropriately changed and implemented without departing from the scope of the present invention.

For example, the shapes, the formation positions and the number of the ribs 21, 22 are not limited to the above illustrative embodiment and can be variously changed. For example, any one of the first rib 21 and the second rib 22 can be omitted, and a rectangular rib formed to surround the operation surface 18*a* may be provided on the front wall 12*d* of the case 12. In this case, when limiting the operation-possible area of the operation surface 18*a* in the touch sensor 19, the position and range thereof may be also changed in correspondence to the rib.

Figure 6:
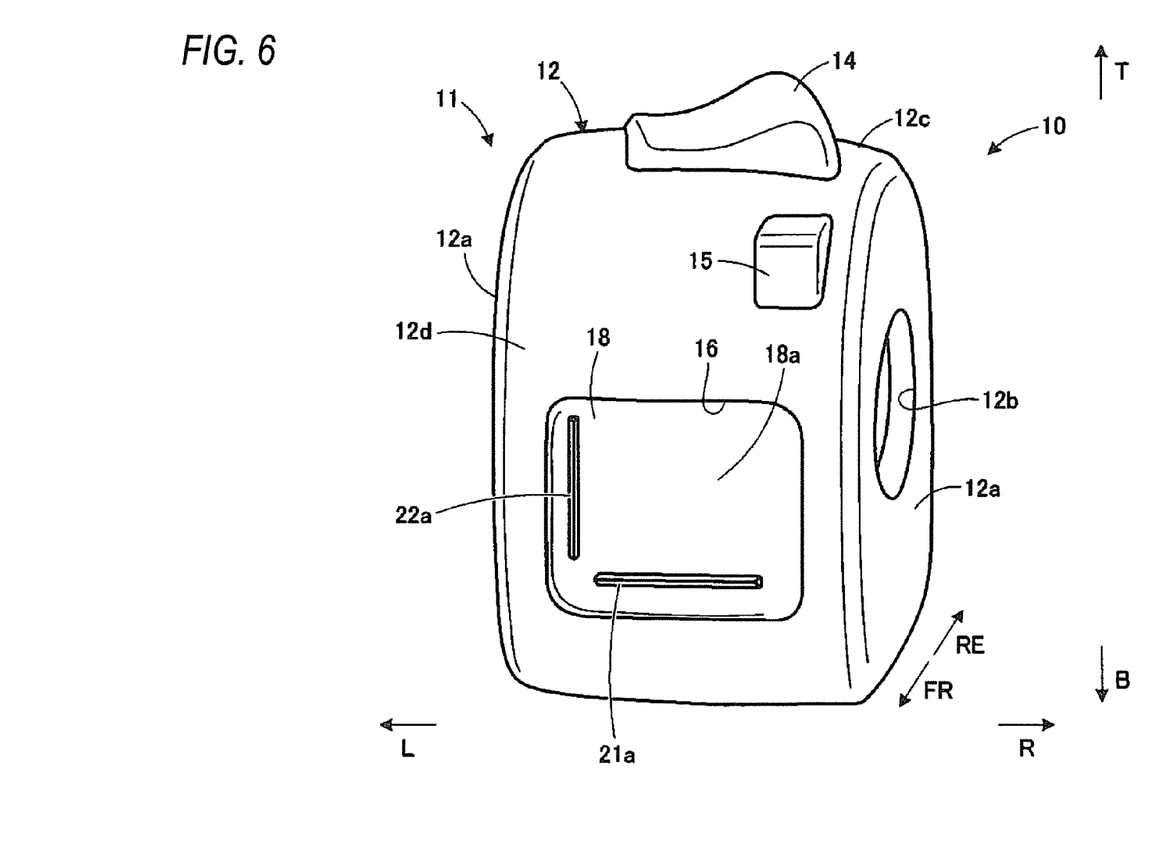
FIG. 6 is a schematic perspective view of a handle switch device according to a modified embodiment.

Also, the rib may include a curved part or a thickness thereof may be changed in the extension direction thereof inasmuch as it is possible to guide the operation of the passenger on the operation surface 18*a* by touching the finger thereto. Further, as shown in a handle switch device according to a modified embodiment of FIG. 6, the touch pad 18 may be formed so that a first rib 21*a* and a second rib 22*a* protrude from the operation surface 18*a*. In FIG. 6, the first rib 21*a* extends along a lower outer rim of the operation surface 18*a* and the second rib 22*a* extends along a left outer rim of the operation surface 18*a*.

Also, the front shape of the operation surface 18*a* is not limited to the rectangular shape, and a variety of shapes such as a circular shape, an elliptical shape, a polygonal shape such as an L shape and a U shape, and the like may be considered. Further, the operation surface 18*a* may be shaped by forming the touch pad 18 into a rectangular shape and the opening 16 into the above-described shape.

Also, the vibration generation device 23 may be configured to vibrate only one of the touch pad 18 and the respective ribs 21, 22. However, a configuration where at least the respective ribs 21, 22 can be vibrated is advantageous because it is easy to propagate the vibration to the finger tip of the passenger.

Further, the control device 11 may be configured to embed a controller having the functions of the ECU 35 therein. However, the above illustrative embodiment is more advantageous because the wiring can be simplified.

Also, the vehicle state is not limited to the stop state and the traveling state. That is, a variety of vehicle states such as a high-speed traveling state and a low-speed traveling state can be adopted.

Further, the handle switch device 10 may be provided at a position adjacent to the left end-side grip part (not shown) of the handle H. In this case, the formation positions of the respective ribs 21, 22 and the like are preferably mirror-reversed.

Also, the handle switch device 10 of the present invention can be applied to a saddle-ridden type vehicle having the similar handle structure, such as a bicycle, an ATV and a snowmobile. Also, the present invention can be applied to a vehicle having a handle such as a control bar and a joystick.

The handle switch device of the present invention is useful as a structure capable of improving the degree of freedom of the input operation by the passenger at a position adjacent to a grip part of a handle, for example.

What is claimed is:
1. A handle switch device provided at a position adjacent to a grip part at an end portion of a handle and provided with a control device for controlling an operation of a predetermined vehicle-mounted device by an operation of a passenger,
   wherein the control device comprises a touch pad having an operation surface that is touched by the passenger upon the operation, a touch sensor configured to detect a touch of the passenger to the operation surface and a computing device configured to perform an operation determination on the basis of an output of the touch sensor,
   wherein the operation surface is formed as a continuous surface that can be touched by the passenger through at least a first sliding operation in a horizontal direction and a second sliding operation in a vertical direction,
   wherein the touch sensor is configured to detect the touch to the operation surface at least by the first and second sliding operations,
   wherein the control device comprises a first rib extending in the horizontal direction to guide the first sliding operation in the horizontal direction and a second rib extending in the vertical direction to guide the second sliding operation in the vertical direction,
   wherein the first and second ribs are formed outside of outer rims of four sides of the operation surface having a rectangular shape, and
   wherein the control device limits an operation-possible area of the operation surface to a periphery of the first and second ribs when the vehicle is traveling.

2. The handle switch device according to claim 1, wherein the control device is used to control a plurality of vehicle-mounted devices and is configured to change a vehicle-mounted device to be a control target, in accordance with a vehicle state or an arbitrary operation of the passenger.

3. The handle switch device according to claim 1, wherein the second rib is provided in the vicinity of one of the outer rims of the operation surface, at a position most distant from a hand of the passenger gripping the grip part.

4. The handle switch device according to claim 1 wherein the control device comprises a vibration generation device configured to vibrate at least one of the first rib, the second rib and the touch pad upon the operation of the passenger.

5. The handle switch device according to claim 1, wherein the control device is configured to enlarge or reduce an operation-possible area of the operation surface, in correspondence to a vehicle state or a vehicle-mounted device to be a control target.

6. The handle switch device according to claim 1, wherein the handle switch device is applied to a saddle-ridden type vehicle.

* * * * *